United States Patent
Welcker

(10) Patent No.: US 6,789,566 B1
(45) Date of Patent: Sep. 14, 2004

(54) SAFETY CONTRIVANCE FOR GAS-USING DEVICE

(76) Inventor: Friedrich Welcker, Im Sonnenwinkel 28, D-58119 Hagen (DE)

( * ) Notice: Subject to any disclaimer, the term of this patent is extended or adjusted under 35 U.S.C. 154(b) by 0 days.

(21) Appl. No.: 09/958,456
(22) PCT Filed: Feb. 29, 2000
(86) PCT No.: PCT/EP00/01692
§ 371 (c)(1), (2), (4) Date: Oct. 5, 2001
(87) PCT Pub. No.: WO00/53961
PCT Pub. Date: Sep. 14, 2000

(30) Foreign Application Priority Data

Mar. 9, 1999 (DE) .................................. 199 10 215
Jan. 7, 2000 (DE) .................................. 100 00 447

(51) Int. Cl.⁷ .............................................. F16K 17/36
(52) U.S. Cl. ..................... 137/464; 137/39; 137/492.5
(58) Field of Search ........................... 137/464, 487.5, 137/492.5, 39

(56) References Cited

U.S. PATENT DOCUMENTS

| | | | | |
|---|---|---|---|---|
| 2,381,447 A | * | 8/1945 | Hedene | 137/462 |
| 3,783,887 A | * | 1/1974 | Shoji | 137/38 |
| 4,098,284 A | | 7/1978 | Yamada | 137/39 |
| 4,207,912 A | * | 6/1980 | Ichikawa | 137/39 |
| 4,572,234 A | * | 2/1986 | Schwelm | 137/492.5 |
| 4,979,528 A | | 12/1990 | Asbra et al. | 137/38 |

FOREIGN PATENT DOCUMENTS

| | | |
|---|---|---|
| DE | 3137116 | 9/1981 |
| DE | 4316584 | 5/1993 |
| DE | 19651012 | 11/1996 |
| EP | 0567787 | 3/1993 |
| WO | 9739269 | 10/1997 |

* cited by examiner

Primary Examiner—Stephen Hepperle
(74) Attorney, Agent, or Firm—Horst M. Kasper

(57) ABSTRACT

In order to safely close a shut-off device (2) used in a gas supply line (1) in the case of danger, the closing part of said shut-off device is coupled with a pneumatic working cylinder (4) whose actuating piston (3) is maintained in the respective open position of the shut-off device (2) by the accessory pressure of $CO_2$ liquid gas cartridge (5) and against the force of a lock spring (6). Under emergency conditions, a ventilating valve (8) which relieves the pressure form the actuating piston (3) is electronically triggered by a gas sensor (10) positioned in a sensor zone by the inactivation of a securing magnet and the shut-off device (2) is safety closed.

25 Claims, 2 Drawing Sheets

SAFETY CONTRIVANCE FOR GAS-USING DEVICE

Figure 1:
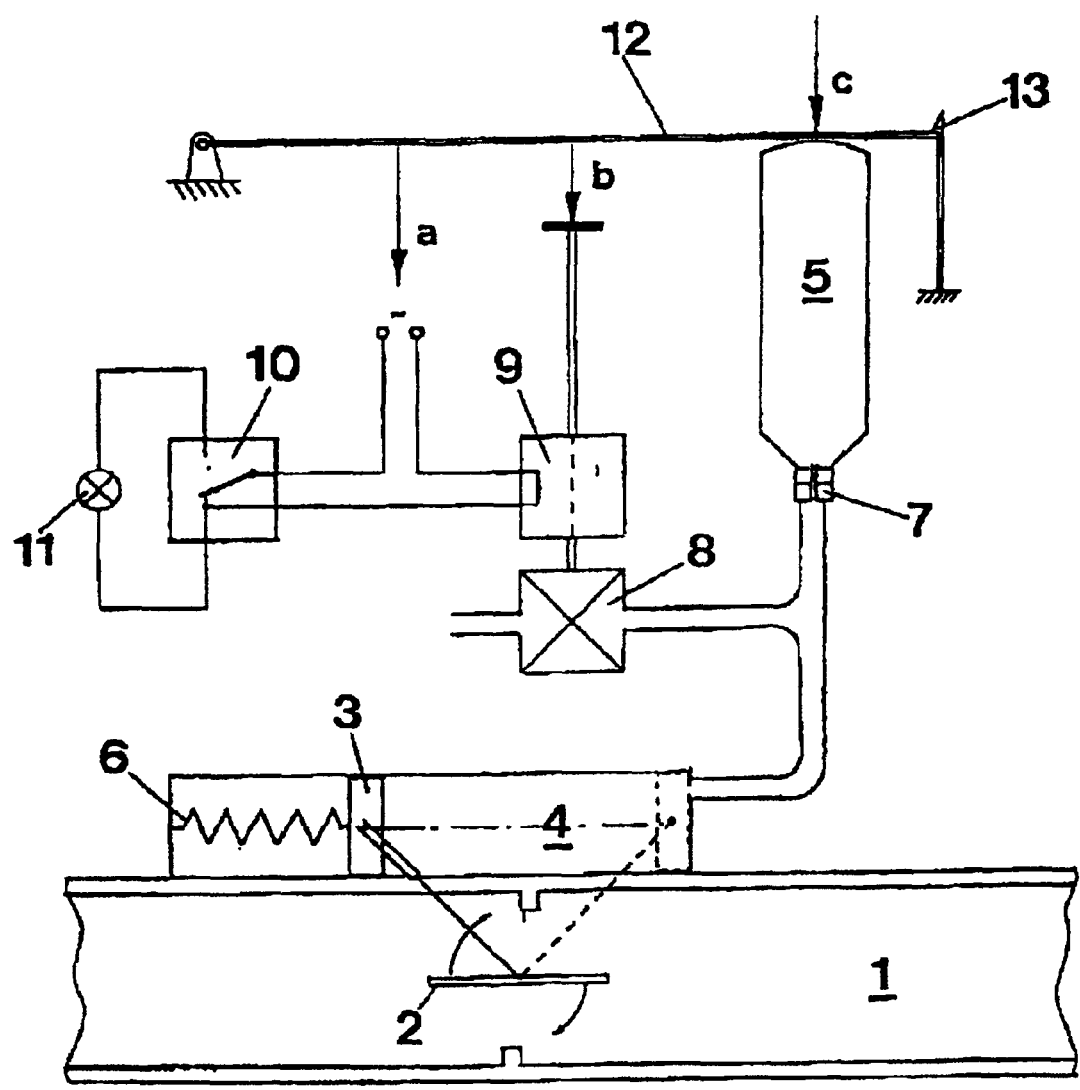

The invention relates to a safety device for systems using gas and having a gas shut-off element that is inserted into the gas connecting line and responds to an incorrect escape of gas in the immediate surrounding area. Devices of this type are used for monitoring local pipeline networks for leaking connecting points and for leaks caused by mechanical effects, corrosion or electrolytic destruction, in order to be able to rectify this damage without delay.

In view of the above, the invention is based on the object of using such a safety device to automatically actuate a gas shut-off element inserted into the connecting pipeline at a suitable point in the event of a gas escape caused by a defect.

In order to achieve this object, the invention forms a safety device for systems using gas according to patent claim 1 to the effect that a gas shut-off element connected into the gas connecting line has a pneumatic operating cylinder arranged on the outside, whose actuating piston is coupled mechanically to the closure part of the gas shut-off element. This actuating piston is held in a position corresponding to the open position of the gas shut-off element by the pressure of a liquid-gas cartridge acting on the operating cylinder and against the force of a closing spring. At the same time, a vent valve which is supplied with the operating cylinder and which is controlled electronically by a gas sensor responding to an incorrect escape of gas in the monitoring area, relieves the pressure on the actuating piston and, as a result of the latter, changes the gas shut-off element from its open position into the closed position.

Expedient configurations and advantageous developments of the invention can be seen from the subsequent subclaims 2 to 11.

According to the features of claim 2, the gas shut-off element inserted into the connecting line is constituted as a pipeline switch in the form of a cock, a flap, a slide or a valve, whose respective actuation is matched to the defined linear movement of the actuating piston within the pneumatic operating cylinder by means of a mechanical gear mechanism.

The vent valve for the operating cylinder and for the liquid-gas cartridge is, according to the features of claim 1, a valve which can initially be set manually into its blocking position against the prevailing line pressure in the monitoring system and which is held in this position by an electromagnet functioning on the quiescent current principle. Accordingly, switching it off by means of the gas sensor used in the respective monitoring area, together with the opening of the vent valve, has the effect of relieving the actuating piston within the operating cylinder in the effect on the gas shut-off element coupled to the piston.

According to the features of claim 4, a combined switching-on mechanism is provided for the replacement of the discharged liquid-gas cartridge, which is necessary for the first time the safety device is commissioned and, after that, is necessary in relation to the repeated commissioning of the safety device following a fault. Said mechanism is, for example, constructed as an actuating handle which is mounted like a lever and such that it can be pivoted on the housing designed to accommodate the various functional elements of the safety device. Using said actuating handle, one after another, firstly the power supply for the monitoring circuit comprising the gas sensor and retaining magnet can be switched on, then the vent valve operated by the energized retaining magnet can be moved into its closed position, and finally the liquid-gas cartridge moving the operating cylinder pneumatically into the corresponding open position of the actual gas shut-off element can be activated by being pressed in a sealing manner into the connecting safeguard present on its mount. Here, any operating errors and non-permitted manipulations, technical defects in individual function elements or else aging phenomena always have the effect of blocking the threatened gas supply and therefore ensure the unconditional intrinsic safety of the overall device.

In order to trigger the safety device in the event of a fault, the gas sensor that reacts to the presence of gas in the monitoring area is equipped, according to the features of claim 5, with an electric changeover contact, by means of which the power supply to the retaining magnet for the vent valve is interrupted in an explosion-proof manner and, instead, an optical or acoustic warning signal is switched on. In this way, the vent valve which relieves the operating cylinder of the pressure from the liquid-gas cartridge automatically effects the safe closing operation of the gas shut-off element under spring force.

In this safety device, a shut-off flap within the gas connecting line is operated, for example, by means of an operating cylinder which is fitted to the outside of the relevant pipeline fitting, to which end the engagement of the necessary coupling linkage on the side of the gas connecting line makes sealing measures necessary, which have to be implemented carefully and be maintained-at time intervals. On the other hand, if a ball cock is used as the gas shut-off element, the outlay on apparatus for converting the linear movement of the actuating piston into a rotational movement, which is loaded by the seal, of the closure part on the side of the cock is likewise complicated, and also overcoming the breaking forces which may occur on the sealing surfaces following a relatively long residence time in the operating state.

In order to avoid such sealing problems and to reduce the effort necessary for actuating a gas shut-off element, according to an advantageous development according to claim 6, the invention forms the same as a through valve which is arranged within the pipeline fitting and, on its own, is itself spring-loaded to close. Furthermore, the valve is held by a pivotable coupling element such that it can be displaced by means of a bellows which, fitted from the outside, engages in the fitting, the bellows, in the operating state, being held in the expanded position by the pressure of the filling of a liquid-gas cartridge and against the restoring force of its own helical compression spring.

The bellows operates as pneumatic operating cylinder and actuating piston of the device at the same time.

In this way, any sealing measures for the gas shut-off element that has to be actuated in the event of a hazard are dispensed with, because of the servomechanisms which are now incorporated directly into the gas-tight pipeline fitting area.

According to the features of claim 7, the through valve in this safety device has a valve disk which can be displaced coaxially and is held by its valve stem on the inner wall of the pipeline fitting by means of radial struts which permit flow. In addition, the closing spring which presses the valve disk against a seating face of the through valve, which is incorporated into the inner wall of the fitting, is supported on the same radial struts. The opening of the valve therefore takes place against the force of this closing spring, which has the effect of blocking the gas supply in every case and with safety in the event of a failure or fault in the actuating torque.

In this case, the bellows that functions as the pneumatic actuator for the valve actuation, according to the features of claim 8, is as such arranged within a pipe connecting piece inserted tightly from the outside into a lateral wall opening in the pipeline fitting. To this end, the free actuating end of the bellows, according to the features of claim 9, is engaged over loosely by a peened-over edge angled inward of a sleeve-like support element which, at its other end, has a peened-over edge angled outward, on which the restoring spring acting against a shoulder on the inner wall of the inserted connecting piece is supported, in order to guide the pneumatically depressurized bellows back into its compressed starting position.

According to the features of claim 10, a two-armed coupling element which can be loaded by the actuating end of the bellows is pivotably mounted at the opening of the inserted connecting piece which reaches into the pipeline fitting, in order to act with its longer lever arm, via a connecting pin guided concentrically within the fitting, on the adjustable valve disk of the through valve. In this way, the respective valve actuation takes place, so to speak in a space which is tightly closed and filled with gas.

In addition, according to the features of claim 11, a solenoid valve which can be triggered in a defined manner is inserted into the capillary tube connection between the bellows serving as the actuator for the through valve and the liquid-gas cartridge which can be inserted interchangeably into the overall device as an energy store, it being possible for said solenoid valve to vent the relevant operative connection and therefore to block the through valve for the gas supply safely.

In this case, this vent valve is preferably triggered in an explosion-proof manner in an electronic way by one or more gas sensors which, in order to monitor the gas concentration present in the environment, are in each case arranged in a potential hazardous area.

Claims 12 and 25 describe the invention in terms of a pneumatic actuator that converts a changing pressure of a pressure source into a mechanical movement of an actuating element. Two possible realisations of such a pneumatic actuator are the operating cylinder/actuating piston and the bellows explained above. Therefore, the above explanations apply analogously to claims 12 to 25, too.

In the appended drawing, a safety device for systems using gas is illustrated schematically, as an exemplary embodiment of the invention, and is described in more detail below in terms of its construction and function.

Figure 2:
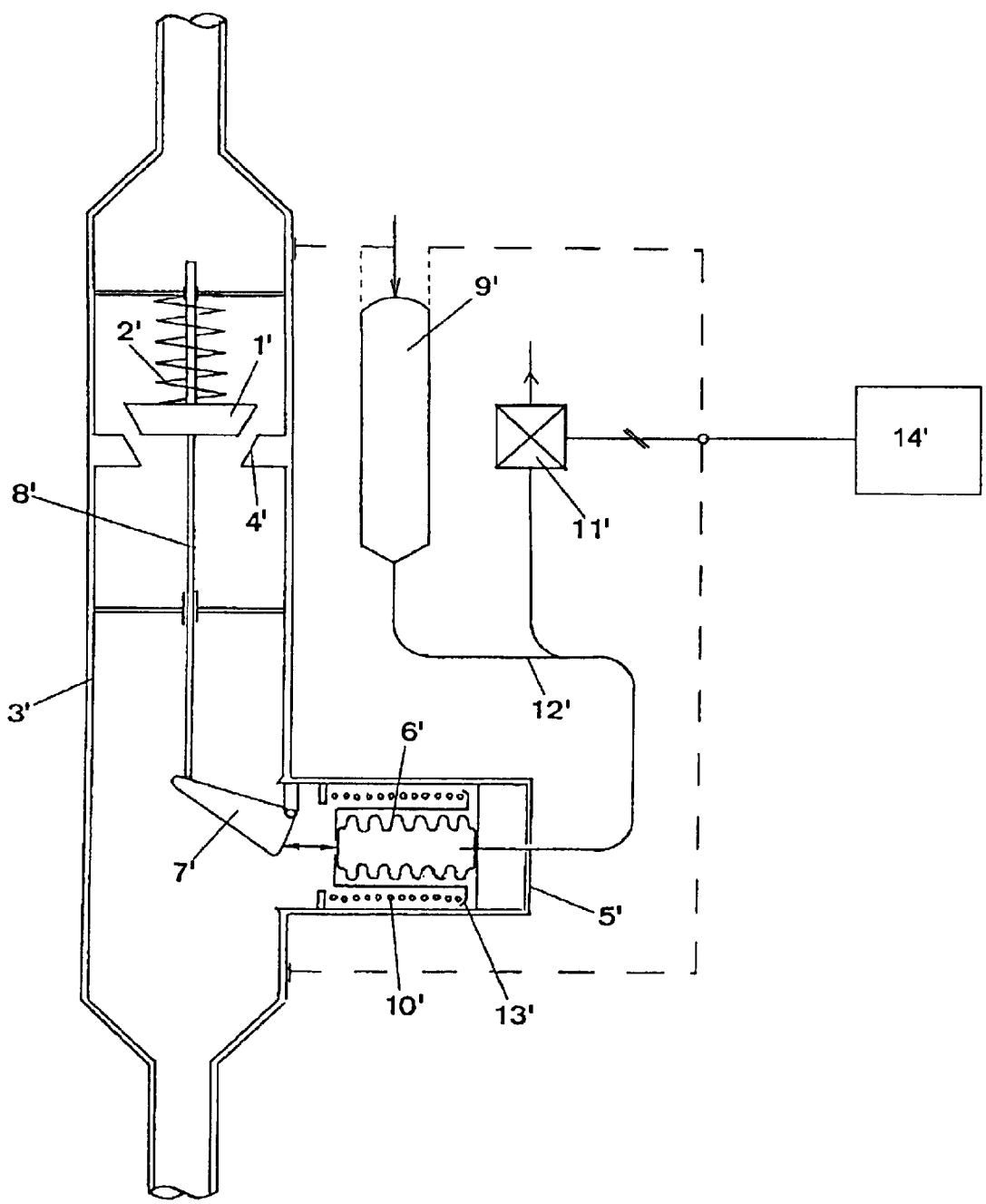

Here, FIG. 1 shows a gas shut-off element with an operating cylinder on the outside, and FIG. 2 shows a shut-off element incorporated into a pipeline fitting, together with its actuating mechanism.

As can be seen from the block diagram in FIG. 1 of the drawing, the gas shut-off element 2 connected into the connecting line 1 is designed here as a shut-off flap, whose closure part is mechanically coupled, via a linkage which reaches to the outside, to the actuating piston 3 of a pneumatic operating cylinder 4 which, in turn, is arranged on the connecting line 1 in the area of the gas shut-off element 2, either permanently or such that it can be retrofitted. In this case, the actuating piston 3 is moved into the position corresponding to the open position of the gas shut-off element 2, against the force of the closing spring 6, by the pressure of the content of a $CO_2$ cartridge 5 introduced into the operating cylinder 4, and is held permanently in said position during non-endangered operation. For this purpose, the $CO_2$ cartridge 5, which can be replaced manually as required, is inserted into the mount provided for the purpose on the side of the housing and, during the course of commissioning the safety device, is pressed onto the existing connecting safeguard 7 in an activating and sealing manner.

In order to trigger the safety device in the event of a fault, the operating cylinder 4 has, on itself or within its feed line, a vent valve 8, by means of which the prevailing pressure is released abruptly and the gas shut-off element 2 is moved into the blocking position by means of the restoring force of a closing spring 6 containing the operating cylinder 4. For this purpose, the vent valve 8 is equipped with an electrically operated retaining magnet 9, by which it is held closed in the energized state. When the gas sensor 10 which is fitted at a suitable point in the monitoring area and reacts to a hazardous escape of gas interrupts the monitoring circuit, which is preferably fed from the AC mains, with the simultaneous switching-on of an optical or acoustic warning signal 11, the retaining magnet 9 drops back, opens the vent valve 8 and therefore transfers the securing device into the blocked state, closing the gas connecting line.

For the commissioning of the safety device whose function was explained above, a combined actuating handle 12 is mounted such that it can move, for example, on a common housing for the operating cylinder 4, the $CO_2$ cartridge 5 and the vent valve 8 with its retaining magnet 9, using which handle, after the $CO_2$ cartridge 5 has been inserted into the mount provided for the purpose, firstly a) the above-described monitoring circuit can be applied to the AC mains installed in the room and, thereafter, b) the retaining magnet 9 for the vent valve 8 can be displaced into its blocking position, after which, finally, c) the $CO_2$ cartridge 5 is pressed onto its connecting safeguard 7 in an activating manner, and therefore the entire securing device is put into operation. After that, the common actuating handle 12 latches by means of an interlock 13 on the housing and holds the securing device reliably and inherently ready for use in an inherently safe manner until any necessary change of a used $CO_2$ cartridge 5 following a fault which has been reported and properly rectified.

At the same time, in order not to react to any failure in the mains supply during the monitoring phase, with erroneous triggering of the safety device, in the event of a mains failure, the relevant monitoring circuit is automatically switched over, for example, to a small NC accumulator as an auxiliary power source which, for its part, is likewise automatically charged up from the mains after the fault has been eliminated.

According to the further block diagram in FIG. 2 of the drawing, the valve disk 1, of the through valve is pressed by the force of its closing spring 2' against the valve seat 4' formed on the wall of the pipeline fitting 3' inserted into the gas connecting line. In order to actuate the through valve 1'/4', within a pipe connecting piece 5 fitted laterally into the wall of the pipeline fitting 3' from the outside, there is arranged, as pneumatic actuator, a bellows 6' which, on its actuating side, acts, via a coupling element 7', pivotably mounted on the opening of the connecting piece, which reaches inward, on the connecting pin 8' which is guided concentrically. against the valve disk 1' in the interior of the pipeline fitting 3'. In this case, this bellows 6' is brought into the open position of the through valve 1'/4' and is retained continuously in this position, during fault-free operation, by the pressure of the filling introduced into it via a capillary line 12' from a liquid-gas cartridge 9' which can be inserted interchangeably into the overall device and, in addition, against the force of a restoring spring 10' that loads the bellows 6' in the path over a sleeve-like support element 13'. Only in the event of a fault will the vent valve 11' connected into the capillary line 12' between the bellows 6' and its liquid-gas cartridge 9' be activated. For this purpose, its electromagnet (retaining magnet) is deenergized by an interruption of the power supply, effected by the gas sensor system installed in the monitoring area, and drops down, whereupon the vent valve 11' opens and, as a result, deactivates the whole of the pneumatics present. Because of this, the bellows 6' returns under the action of the helical compression spring 10', and the through valve 1'/4' connected mechanically to it returns into the blocking position of the safety device under the action of the closing spring 2' of said through valve. They remain in this position until the disruption has been eliminated or the fault has been rectified, the vent valve 11' has been closed again and the discharged liquid-gas cartridge 9' has been replaced by hand by a new one.

What is claimed is:

1. A safety device for systems using gas, comprising:
   - a gas shut-off element with a closure part, the gas shut-off element being disposed in a connecting line, the gas shut-off element having an open position and a closed position, and the gas shut-off element responding to the incorrect escape of gas by moving from the open to the closed position;
   - an operating cylinder which is arranged on the gas shut-off element and whose actuating piston is coupled mechanically to the closure part of the gas shut-off element and is held in the open position of the gas shut-off element by the pressure of a liquid-gas cartridge acting on the operating cylinder and against the force of a closing spring;
   - a vent valve, on the operating cylinder, which relieves the pressure on the actuating piston if it is moved from a blocking position to an open position, the vent valve being controlled electrically by means of a gas sensor arranged in the area to be monitored by the safety device,
   - wherein the vent valve can be moved mechanically into its blocking position and held in this position against the prevailing pressure by an electromagnet.

2. The safety device as claimed in claim 1, further comprising a linkage mechanism which converts the linear movement of the actuating piston on the side of the operating cylinder into a corresponding actuation for the gas shut-off element being selected from the group consisting of a cock and a flap.

3. The safety device as claimed in claim 1, comprising a linkage mechanism which converts the linear movement of the actuating piston on the side of the operating cylinder into a corresponding actuation for the gas shut-off element, the gas shut-off element being selected from the group consisting of a slide and a valve.

4. A safety device for systems using gas comprising
   - a gas shut-off element with a closure part, the gas shut-off element being disposed in a connecting line, the gas shut-off element having an open position and a closed position, and the gas shut-off element responding to the incorrect escape of gas by moving from the open to the closed position;
   - an operating cylinder which is arranged on the gas shut-off element and whose actuating piston is coupled mechanically to the closure part of the gas shut-off element and is held in the open position of the gas shut-off element by the pressure of a liquid-gas cartridge acting o n the operating cylinder and against the force of a closing spring;
   - a vent valve, on the operating cylinder, which relieves the pressure on the actuating piston if it is moved from a blocking position to an open position, the vent valve being controlled electrically by means of a gas sensor arranged in the area to be monitored by the safety device;
   - a combined switching-on mechanism by means of which, in a chronological sequence, a) the power supply for the monitoring circuit is provided, b) the vent valve is moved into its blocking position, and c) the liquid-gas cartridge on its connecting safeguard is activated.

5. A safety device for systems using gas comprising
   - a gas shut-off element with a closure part, the gas shut-off element being disposed in a connecting line, the gas shut-off element having an open position and a closed position, and the gas shut-off element responding to the incorrect escape of gas by moving from the open to the closed position;
   - an operating cylinder which is arranged on the gas shut-off element and whose actuating piston is coupled mechanically to the closure part of the gas shut-off element and is held in the open position of the gas shut-off element by the pressure of a liquid-gas cartridge acting on the operating cylinder and against the force of a closing spring;
   - a vent valve, on the operating cylinder, which relieves the pressure on the actuating piston if it is moved from a blocking position to an open position, the vent valve being controlled electrically by means of a gas sensor arranged in the area to be monitored by the safety device;
   - a gas sensor having a changeover contact for the explosion-proof switching-off of an electromagnet (retaining) magnet for the vent valve and for the simultaneous switching-on of an optical or acoustic warning signal.

6. A safety device for systems using gas comprising
   - a gas shut-off element with a closure part, the gas shut-off element being disposed in a connecting line, the gas shut-off element having an open position and a closed position, and the gas shut-off element responding to the incorrect escape of gas by moving from the open to the closed position;
   - an operating cylinder which is arranged on the gas shut-off element and whose actuating piston is coupled mechanically to the closure part of the gas shut-off element and is held in the open position of the gas shut-off element by the pressure of a liquid-gas cartridge acting on the operating cylinder and against the force of a closing spring;
   - a vent valve, on the operating cylinder, which relieves the pressure on the actuating piston if it is moved from a blocking position to an open position, the vent valve being controlled electrically by means of a gas sensor arranged in the area to be monitored by the safety device;
   - a coupling element which is capable of being pivoted and engaging in a pipeline fitting between a through valve that can be adjusted against the force of a closing spring and a bellows that is loaded in its actuating direction by a restoring spring and can be expanded by means of the filling of a liquid-gas cartridge.

7. The safety device as claimed in claim 6, further comprising
   - a coaxially displaceable valve disk which belongs to the through valve and which is mounted by its valve stem on the inner wall of the pipeline fitting by means of radial struts which permit flow and, by means of the closing spring supported on the radial struts, is pressed against a seating face arranged on the pipeline-fitting side of the through valve.

8. The safety device as claimed in claim 6, further comprising
an inserted connecting piece which can be fitted from the outside in an opening in the wall of the pipeline fitting, upstream of the through valve, to hold and retain the bellows acting on said through valve.

9. The safety device as claimed in claim 6, further comprising
a sleeve-like support element which, with a peened-over edge angled inward, engages over the actuating end of the bellows,
a helical compression spring that acts as a restoring force being supported opposite, on a peened-over edge angled outward, against a shoulder on the inner wall of the inserted connecting piece.

10. The safety device as claimed in claim 8, further comprising a two-armed coupling element which is pivotably mounted on the inside of the inserted connecting piece, immediately in front of the actuating end of the bellows, to act on a valve disk on the side of the through valve via a connecting pin guided concentrically within the fitting.

11. The safety device as claimed in claim 6, further comprising
a capillary tube connection between the liquid-gas cartridge to be interchangeably inserted into the device and the bellows functioning as the actuator for the through valve, it being possible for this pressure line to be vented by a magnetic (retaining) valve that can be triggered electrically/electronically.

12. A safety device for systems using gas, comprising, a gas shut-off element with a closure part, the gas shut-off element being disposed in a connecting line, the gas shut-off element having an open position and a closed position, and the gas shut-off element responding to the incorrect escape of gas by moving from the open to the closed position;
a pneumatic actuator which is arranged at the gas shut-off element and whose actuating element is coupled mechanically to the closure part of the gas shut-off element and is held in the open position of the gas shut-off element by the pressure of a pressure source acting on the pneumatic actuator and against the force of a restoring element;
a vent valve which relieves the pressure on the pneumatic actuator if it is moved from a blocking position to an open position, the vent valve being controlled electrically by means of a gas sensor arranged in the area to be monitored by the safety device, wherein the vent valve can be moved mechanically into its blocking position and held in this position against the prevailing pressure by an electromagnet.

13. The safety device as claimed in claim 12, wherein the pneumatic actuator comprises an operating cylinder with an actuating piston as actuating element.

14. The safety device as claimed in claim 12, wherein the pneumatic actuator comprises a bellows as actuating element that can be extended by means of the filling of the pressure source.

15. The safety device as claimed in claim 12, further comprising a linkage mechanism which converts a linear movement of the actuating element on the side of the pneumatic actuator into a corresponding actuation for the gas shut-off element, the gas shut-off element being selected from the group consisting of a cock, a flap, a slide and a valve.

16. The safety device as claimed in claim 12, further comprising
a combined switching-on mechanism by means of which, in a chronological sequence, a) the power supply for the monitoring circuit is provided, b) the vent valve is moved into its blocking position, and c) the pressure source is activated.

17. The safety device as claimed in claim 12, further comprising
a gas sensor having a changeover contact for the explosion-proof switching-off of an electromagnet (retaining) magnet for the vent valve and for the simultaneous switching-on of an optical or acoustic warning signal.

18. The safety device as claimed in claim 12, wherein the gas shut-off element is a through valve that can be adjusted against the force of a closing spring, the safety device comprising a coupling element which is capable of being pivoted and engaging in a pipeline fitting between the through valve and the actuating element.

19. The safety device as claimed in claim 18, further comprising a coaxially displaceable valve disk which belongs to the through valve and which is mounted by its valve stem on the inner wall of the pipeline fitting by means of radial struts which permit flow and, by means of the closing spring supported on the radial struts, is pressed against a seating face arranged on the pipeline-fitting side of the through valve.

20. The safety device as claimed in claim 18, further comprising an connecting piece which can be fitted from the outside in an opening in the wall of the pipeline fitting, upstream of the through valve, to hold and retain the pneumatic actuator acting on said through valve.

21. The safety device as claimed in claim 14, further comprising a sleeve-like support element which, with a peened-over edge angled inward, engages over the actuating end of the bellows, and a helical compression spring that acts as a restoring force being supported opposite, on a peened-over edge angled outward of the sleeve-like support element.

22. The safety device as claimed in claim 21, further comprising a two-armed coupling element which is pivotably mounted on the inside of the connecting piece, immediately in front of the actuating element, to act on a valve disk on the side of the through valve via a connecting pin guided concentrically within the fitting.

23. The safety device as claimed in claim 12, further comprising a capillary tube connection between the pressure source and the pneumatic actuator.

24. The safety device as claimed in claim 12, wherein the pressure source is a liquid-gas cartridge.

25. The safety device as claimed in claim 12, wherein the restoring element is a spring.

* * * * *